United States Patent [19]

Carle et al.

[11] 4,272,708
[45] Jun. 9, 1981

[54] WINDOW LIFTER INSTALLATION

[75] Inventors: Hermann Carle, Lochgau; Heribert Klement, Bietigheim-Bissingen; Uwe Knobloch, Heilbronn-Sontheim, all of Fed. Rep. of Germany

[73] Assignee: ITT Industries, Inc., New York, N.Y.

[21] Appl. No.: 32,471

[22] Filed: Apr. 23, 1979

[30] Foreign Application Priority Data

May 10, 1978 [DE] Fed. Rep. of Germany ....... 2820330

[51] Int. Cl.³ .............................................. H02P 1/22
[52] U.S. Cl. .................................... 318/266; 318/466; 318/286
[58] Field of Search ............... 318/264, 266, 276, 282, 318/283, 286, 290, 447, 466, 469

[56] References Cited

U.S. PATENT DOCUMENTS

| 3,513,374 | 5/1970 | Koment | 318/286 |
| 3,581,174 | 5/1971 | Hammer | 318/266 |
| 3,624,473 | 11/1971 | Robbins | 318/466 |
| 3,644,811 | 2/1972 | Robbins | 318/266 |
| 3,675,101 | 7/1972 | Robbins | 318/447 |
| 3,891,909 | 6/1975 | Newson | 318/282 |

Primary Examiner—Stanley J. Witkowski
Assistant Examiner—John W. Redman
Attorney, Agent, or Firm—James B. Raden; William J. Michals

[57] ABSTRACT

This invention refers to a circuit arrangement for a motor for the purpose of driving a window in motor vehicles comprising a motor current supervising stage for switching the motor in case of blocking, wherein the motor current supervising stage responds to a change in time of the motor current. The dynamic supervising of the motor current offers a greater reliability than the known static supervising of the motor current. The circuit senses a rapid change in motor current to indicate that the window has met an undesired (e.g a human) obstacle.

8 Claims, 2 Drawing Figures

WINDOW LIFTER INSTALLATION

BACKGROUND OF THE INVENTION

This invention relates to power window controls for automotive vehicles and, more particularly, to a control circuit for such devices.

For safety, the motor of window lifter installations in motor vehicles must be switched off immediately, or its direction of rotation has to be reversed, when the window meets an obstacle. In known versions this is ensured by a current supervising stage which responds as soon as the motor current exceeds a given threshold value determined experimentally. On the other hand, the motor must be able to bring a tight window home into the end position. The torque reserve necessary for it in most installations is greater than the admissible torque for safety considerations. Known circuit arrangements with a static evaluation of the motor current proportional to the torque of the motor are not successful in practice, because these conflicting requirements could not be complied with.

The invention is based on the problem to develop a circuit arrangement for such an actuating drive, by which the danger of injury is effectively avoided, but in spite of this the movable element is driven with a sufficient torque in particular cases. This problem is solved by the features of the present invention.

The invention is thereby based on the knowledge that a continuous change in the torque and in the current may be measured, when the movable element enters the end position, thus when for instance a window enters the upper window guidance, whereas in contrast thereto a change in torque or in the current is very rapidly effected, when the movable element meets an obstacle. While in known installations the current supervising stage alone responds to the instantaneous value of the motor current, in a circuit arrangement according to the invention a dynamic current control is effected. Thereby it is simultaneously achieved that the current supervising stage does not respond, when the movable element is continuously tight, because a rapid change in current is not effected. Thus dimensioning of the circuit arrangement is less critical and in this case the maximum torque of the motor can be used to drive the movable element.

According to an advantageous improvement of the invention it is provided that the current supervising stage responds in addition—as in itself known—to a given static current threshold value. The combination of the static and dynamic current control improves the operating reliability and above all is more accident-proof, because the motor switches off too and reverses its direction of rotation respectively, when during a gradual current increase to a value near the short-circuit current a current increase releasing the response of the current supervising stage is no longer possible. It became apparent that it is of advantage to drive the movable element by a motor the maximum torque and the short-circuit current of which respectively considerably exceeds the value which under the most unfavorable operating conditions is necessary to adjust the movable element, because in this case, where the dimensions of the dynamic response threshold of the current supervising stage are adapted to a relatively rapid current increase in time, the current supervising stage reacts rapidly on extremely high values, also after a gradual current increase.

SUMMARY OF THE INVENTION

The combination of a static and a dynamic current sensing is embodied in the present invention. In order to prevent that the current supervising stage responds to the load inrush current of the motor current a capacitor is provided for damping purposes. A bistable toggle stage is provided to prevent that the motor current is periodically switched on and off and said bistable toggle switch only by the operating switch is again brought into the condition which allows sensing of the motor current. Thus it is ensured that the motor remains switched off after the motor current supervising stage responded until the operating switch is actuated anew, which is necessary on grounds of safety. However, on grounds of safety a solution will be preferred in which the direction of rotation is changed after switching off of the motor and the movable element automatically returns to its end position. An improvement of the invention serves this purpose. In order to provide that the movable element returns to the end position too, when the operating switch is opened, the second switching element is controlled via a storage which is quenched only, when the current supervising stage responds again.

BRIEF DESCRIPTION OF THE DRAWING

The invention is described below in detail by way of two circuit arrangements depicted in FIGS. 1 and 2.

DETAILED DESCRIPTION

Figure 1:
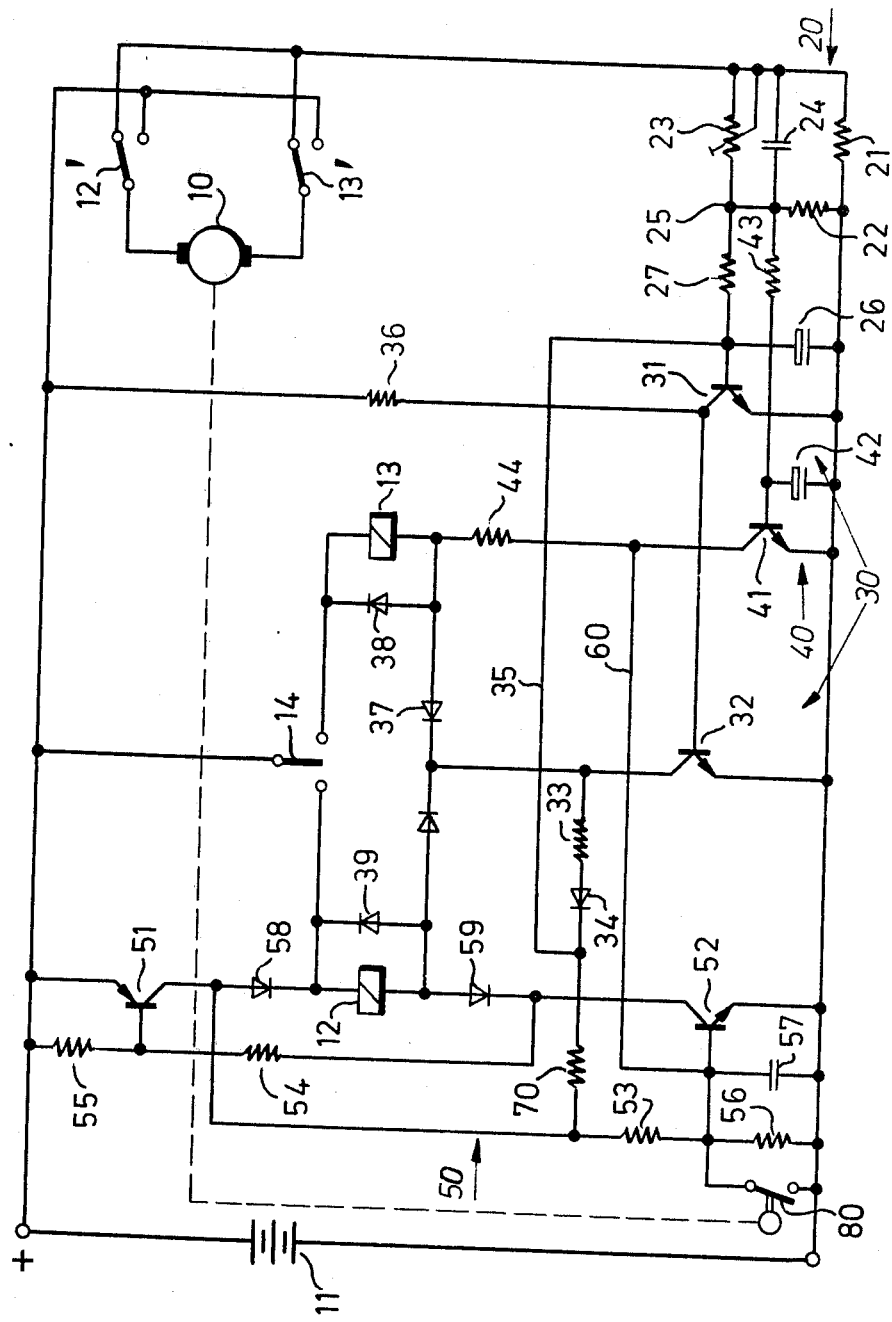

In FIG. 1 the electric motor which is fed out of a voltage source 11 is designated by 10. Two switching elements 12 and 13 designed as changeover relays actuate the respective changeover contacts 12' and 13' via which the motor 10 may be short-circuited or its direction of rotation may be reversed. The circuit arrangement is controlled by an operating switch 14. It is assumed that the window pane of a motor vehicle driven by the electric motor is moved upwards, when the relay 13 is energized, while the window pane is moved downwards, when the relay 12 is energized.

The current supervising stage 20 contains a measuring resistor 21 in the motor circuit, to which a voltage divider consisting of the resistors 22 and 23 is switched in parallel, whereby to the preferably variable resistor 23 a capacitor 24 is connected in parallel. In the tapping 25 of said voltage divides a reset signal may be measured which depends on the motor current. The capacitor 26 and the resistor 27 form a timing element to compensate current peaks during the starting process of the motor.

The transistors 31 and 32 form a bistable toggle stage 30, for the output signal of the transistor 32 is fed back to the input of the transistor 31 via resistor 33, diode 34 and lead 35. The resistor 36 serves as an operating resistor for the transistor 31 and conducts control voltage to the other transistor 32, so that it is prepared for the conductive condition. The diode 37 serves as decoupling diode, the diode 38 as quenching diode for the relay 13.

The circuit arrangement described until now serves for the purpose of switching off the motor as soon as the movable element is running against an obstacle and the motor current increases.

In the rest condition the transistor 31 is blocked, because no reset signal can be measured on the measuring resistor 21 and thereby on the tapping 25 of the voltage divider, when the motor 10 is short-circuited and separated from the voltage source 11. Base current flows into the transistor via the resistor 36 which thereby becomes conductive as soon as the operating switch is changed over. The relay 13 is energized via the diode 37 and the collector-emitter-path of the transistor 32. The contact 13' is changed over and the motor is started in one direction of rotation, whereby the window pane is moved upwards. The current increase in time during the starting process indeed is relatively high, but the transistor 31 remains blocked, because at first the capacitor 26 would have to be recharged. For this purpose the load inrush current is, however, not sufficient. During the normal continuous operation a voltage of 0.4 volt is applied on the base of the transistor 31, so that the diode 34 is blocked as long as the saturation voltage may be measured on the conductive transistor 32. If the motor current increases rapidly, when the window pane meets an obstacle, the increase potential on the measuring resistor 21 is conducted to the tapping 25 of the voltage divider via the capacitor 24. Thereby the transistor 31 is switched to the conductive switching condition and the transistor 32 is blocked, so that the relay 13 is deenergized and the motor 10 is short-circuited again. The high output voltage of the transistor 32 which is fed back to the base of the transistor 31 holds the latter in conductive condition, also if the reset signal is quenched again, when the motor 10 is short-circuited. The toggle stage with the transistors 31 and 32 can only be switched over to the other switching condition by returning the operating switch into the neutral position shown in the drawing. If, during operation, the motor current rises only gradually the capacitor 24 practically has no effect. Then the transistor 31 responds only at the time, when the static voltage on the tapping 25 of the voltage divider exceeds the base-emitter threshold voltage of the transistor 31. This means for the concrete case of application that upon relatively quick changes in torque and thereby changes in current, thus when the pane is meeting an obstacle, the changeover is effected immediately, when the momentary current value is low, but on the other hand, when the torque changes slowly, that means when the pane moves into the upper guidance, a switching off is only effected by a very high static motor current.

The just described mode of operation is given too, when the operating switch is switched over to the other operating position in which the relay 12 is energized. On grounds of safety it is now necessary not only to switch off the motor in case of trouble, but to drive to its other end position to release a squeezed-in body. Thereby this process is to be effected independently of a switching process of the operating switch always, when the current supervising stage responds at first.

A transistor switching stage 40 with the transistor 41, the capacitor 42 and the resistor 43 evaluates the motor current too. The collector of said transistor 41 is connected to the relay 13 via a resistor 44, so that this transistor can only receive collector voltage, when the operating switch 14 occupies the right-hand switching position for upward operation. The capacitor 43 absorbs the peaks of the inrush current after the reverse of the electric motor 10.

The control circuit of the second switching element, namely the relay 12, is formed by two switches in the shape of the transistors 51 and 52 which form a storage 50, for the output voltage of the transistor 51 is conducted via the resistor 53 to the base of the transistor 52 and the output voltage of the latter is conducted to the base of the first transistor 51 via the resistor 54. The resistors 55 and 56 serve for depletion of the base, the capacitor 57 filters out parasitic voltages. The capacitor 56 also serves for the purpose of deriving undesired current from the feedback via the resistors 70 and 53.

The transistor 51 in series with a decoupling diode 58 bridges the operating switch 14. The transistor 52 in series with a further decoupling diode 59 can take over the current via the relay 13, which originally was conducted by the transistor 32. Thus it can be ensured by this supplemented circuit that the motor is moved downwards, also when the operating switch 14 occupies the neutral position.

This storage with the transistors 51 and 52 can only be set, if the operating switch occupies the right-hand position for upward operation and the transistor 32 of the toggle stage 30 is blocked. Only then the base of the transistor 52 is applied to a sufficiently positive potential via operating switch 14, relay 13 and resistor 44 as well as via the lead 60. This is the case, if during upward operation the current supervising stage responded. Thus the transistors 51 and 52 are conductive, so that shortly after the motor was short-circuited the contact 12' is changed over and the polarity of the motor is reversed. The transistors 51 and 52 hold themselves via the feedback resistors 53 and 54.

The storage 50 with the transistors 51 and 52 can only be reset, if the transistor 41 becomes conductive, because the collector-emitter voltage of the transistor can nearly short-circuit the base-emitter voltage of the transistor 52. The transistor 41 becomes conductive as soon as the motor current supervising stage responds again.

This means in practice that the motor 10 is at first switched off via the toggle stage 30, when the movable element meets an obstacle, thereafter the polarity of the motor 10 is reversed, when the relay 12 responds and the pane is moved upwards until in the lower end position the current supervising stage responds again.

Furthermore, a feedback from the storage 50 to the base of the transistor 31 via resistor 70 and lead 35 is essential in this circuit arrangement. By said feedback it is prevented that the two relays 12 and 13 are responding simultaneously. When the transistor 51 is conductive via said feedback branch nearly positive operating voltage is switched on the base of the transistor 31, so that this transistor remains conductive independent of the momentary motor current and blocks the transistor 32.

When the upward movement of the pane is blocked at first both transistors 31 and 41 are switched over to the conductive position. The transistor 31 effects a blocking of the transistor 32 and thereby a short-circuit of the motor via the relay 13. The current supervising stage is dead, so that the transistor 41 is blocked again. Thus the storage 50 with the transistors 51 and 52 is set which in turn hold the transistor 31 conductive. When the current input rises again, this affects only the transistor 41 which then becomes conductive again and quenches the storage 50.

In order to prevent that the polarity of the motor is reversed during the upward movement a feedback switch 80 is provided which for instance closes when the pane has such a small spacing from the end position that squeezing will have no longer to be feared. Said feedback switch 80 prevents a setting of the storage 50 by short-circuit of the control input of the transistor 52. It would be also imaginable to switch off the circuit to the capacitor of the current supervising stage or to bridge the measuring resistor 21, so that the pane can be brought into the upper rest position with full torque.

Figure 2:
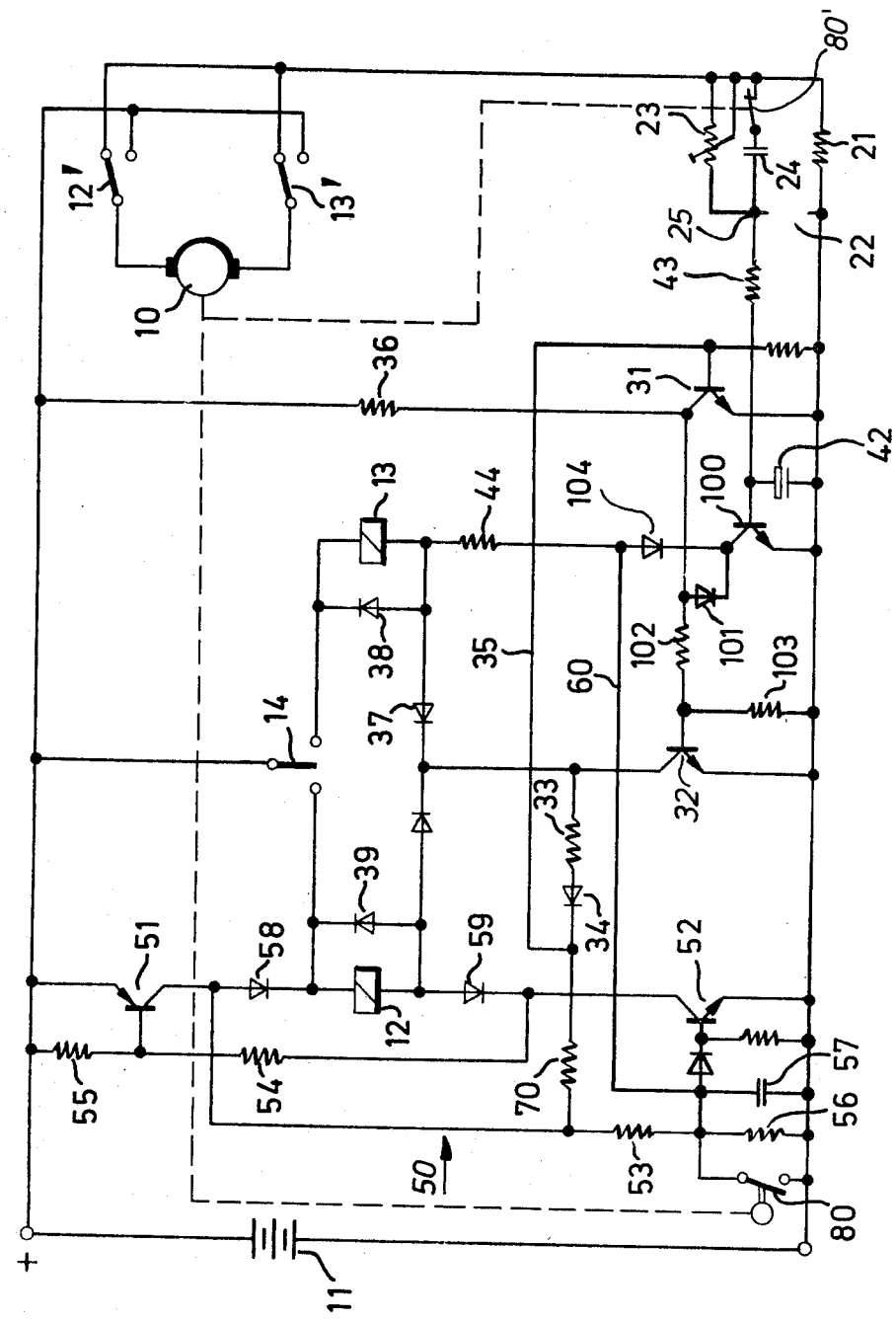

FIG. 2 shows a modification of the circuit arrangement according to FIG. 1 in which the output voltage of the current supervising stage only affects a transistor 100. The transistors 31 and 32 again form a toggle stage which, however, is controlled via transistor 100, diode 101 and voltage divider 102, 103 on the base of the transistor 32. The quenching signal for the storage 50 is tapped from the collector of the transistor 100 via the diode 104. Compared to the embodiment according to FIG. 1 this version has the advantage that to the current supervising stage two transistor switching stages are not connected in parallel, the threshold voltages of which have to be adjusted to each other by means of the resistors 26, 27. An essential functional difference does not exist.

In the circuit arrangement according to FIG. 2 a further switch 80' in the circuit of the capacitor 24 of the current supervising stage 20 is actuated by the movable element and the electric motor 10 respectively, through which switch the dynamic current sensing may be switched off. It is of course imaginable to realize the switch 80' by electronic methods, for instance via switch diodes and/or transistors, which is also controlled by the switch 80. Besides, it can be necessary to connect a resistor in series with the capacitor 24, whereby said resistor effects that only a rapid change in current to a given value available for a given time is sufficient to connect through the transistor 31. In this manner it is achieved that a blocking of the movable element for only a short time will not result in switching off the electric motor 10.

What is claimed is:

1. A circuit arrangement for the purpose of driving a movable window element or the like in motor vehicles, comprising: an operating switch, an electric motor fed out of a voltage source and controlled by way of a switching element and a motor current supervising stage affecting the switching element, wherein the motor current supervising stage at least at times recognizes a reset signal derived from a given change in time of the motor current, wherein the motor current supervising stage recognizes a reset signal derived from a given static motor value, wherein the maximum torque of the motor exceeds by 20 percent, the torque necessary to drive the movable element in the most unfavorable case of operation, wherein the drop in voltage on a measuring resistor in the motor circuit serves as a reset signal, to which measuring resistor a voltage divider with a resistor and a parallel circuit consisting of a preferably variable resistor and a capacitor is connected in parallel, whereby the reset signal may be measured on the voltage divider tapping, wherein the load inrush current of the motor is absorbed by a capacitor, wherein the motor current supervising stage affects the switching element via a bistable toggle stage which may be quenched by the reset signal and be brought back to the other switching condition only by means of a switching process of the operating switch, wherein the operating voltage may be conducted to at least one switching member of the toggle stage via the operating switch, wherein a switching member of the toggle stage is connected with the switching element and the operating switch is connected in series to the voltage source, wherein the toggle stage is provided with two transistors of which one is located in the control circuit of the switching element as switching member and is controlled by the second transistor, whereby the output signal of the first transistor is fed back to the control voltage, wherein the reset signal is conducted to the second transistor as control voltage, wherein the reset signal is conducted to the first transistor via a further switching stage, wherein the motor is switched off via the toggle stage and a further switching element is controlled to reverse the direction of rotation of the motor, whereby the control circuit of said second switching element is interrupted, when the current supervising device detects a reset signal, wherein a further transistor switching stage serves for the control of the control circuit of the second switching stage serves for the control of the control circuit of the second switching element, whereby the reset signal is conducted to said transistor switching stage, wherein the control circuit of the second switching element is affected by the transistor switching stage which also controls the toggle stage, and wherein the two switching elements comprise one changeover relay each through which the motor may be depolarized or short-circuited, whereby shorting of the motor winding takes place before reversing the motor.

2. Circuit arrangement according to claim 1, wherein both changeover relays are selectively controllable via the operating switch and the control circuit for both changeover relays is conducted via a switching member of the toggle stage.

3. A circuit arrangement for the purpose of driving a movable window element or the like in motor vehicles, comprising: an operating switch, an electric motor fed out of a voltage source and controlled by way of a switching element and a motor current supervising stage affecting the switching element, wherein the motor current supervising stage at least at times recognizes a reset signal derived from a given change in time of the motor current, wherein the motor current supervising stage recognizes a reset signal derived from a given static motor value, wherein the maximum torque of the motor exceeds by 20 percent, the torque necessary to drive the movable element in the most unfavorable case of operation, wherein the drop in voltage on a measuring resistor a voltage divider with a resistor and a parallel circuit consisting of a preferably variable resistor and a capacitor is connected in parallel, whereby the reset signal may be measured on the voltage divider tapping, wherein the load inrush current of the motor is absorbed by a capacitor, wherein the motor current supervising stage affects the switching element via a bistable toggle stage which may be quenched by the reset signal and be brought back to the other switching condition only be means of a switching process of the operating switch, wherein the operating voltage may be conducted to at least one switching member of the toggle stage via the operating switch, wherein a switching member of the toggle stage is connected with the switching element and the operating switch is connected in series to the voltage source, wherein the toggle stage is provided with two transistors of which one is located in the control circuit of the switching element as switching member and is controlled by the second transistor, whereby the output signal of the first transistor is fed back to the control input of the second transistor, wherein the reset signal is conducted to the second transistor as control voltage, wherein the reset signal is conducted to the first transistor via a further switching stage, wherein two switches are located in the control circuit of the second switching element, whereby the one switch bridges the operating switch and the other switch takes over the current from the switching member of the toggle stage.

4. Circuit arrangement according to claim 3, wherein the switches form a storage in the control circuit of the second switching element, said storage being set via the toggle stage and the operating switch and is quenched only, when the current supervising stage again detects a reset signal.

5. Circuit arrangement according to claim 4, wherein the switches in the control circuit of the second switching element are transistors and a quenching signal of the current supervising stage and a set signal of the toggle stage are conducted to the control input of the first transistor, whereby the second transistor bridging the operating switch is controlled by said first transistor, and the output signal of said second transistor is fed back to the control input of the first transistor.

6. Circuit arrangement according to claim 5, characterized in that the transistor is held conductive by the one transistor of the storage, by way of a resistor.

7. Circuit arrangement according to claim 6, wherein setting of the storage is prevented by a feedback switch which may be affected by a movable element.

8. Circuit arrangement according to claim 7, wherein the circuit through the capacitor of the current supervising stage is switched by way of the feedback switch.

* * * * *